United States Patent [19]
Hehl

[11] Patent Number: 5,374,177
[45] Date of Patent: Dec. 20, 1994

[54] MOLD CLOSING UNIT FOR USE IN AN INJECTION MOLDING MACHINE FOR SYNTHETIC MATERIAL

[76] Inventor: Karl Hehl, Arthur-Hehl-Str. 32, 7298 Lossburg 1, Germany

[21] Appl. No.: 50,605

[22] Filed: Apr. 22, 1993

[30] Foreign Application Priority Data

Apr. 25, 1992 [DE] Germany .............. 4213655
Jul. 6, 1992 [DE] Germany .............. 4222107

[51] Int. Cl.⁵ .................. B29C 45/14; B29C 45/42; B29C 45/64
[52] U.S. Cl. ................. 425/126.1; 425/190; 425/556; 425/589; 425/592; 425/436 R; 425/436 RM; 425/451; 425/451.4; 425/451.5; 425/451.9; 425/453
[58] Field of Search ............. 425/185, 183, 190, 117, 425/589, 556, 592, 451.3, 451.4, 451.9, 453, 444, 125, 126.1, 441, 436 R, 436 RM, 422, 451, 451.5

[56] References Cited

U.S. PATENT DOCUMENTS

| | | | |
|---|---|---|---|
| 3,973,888 | 8/1976 | Hehl | 425/126.1 |
| 3,993,787 | 11/1976 | Nakabayashi et al. | 425/125 |
| 4,462,786 | 7/1984 | Perryman | 425/126.1 |
| 4,664,614 | 5/1987 | De Rossi | 425/185 |
| 4,735,761 | 4/1988 | Lindenberger | 425/126.1 |
| 4,793,784 | 12/1988 | Belleville et al. | 425/126.1 |
| 5,230,908 | 7/1993 | Morgan | 425/185 |

FOREIGN PATENT DOCUMENTS

| | | |
|---|---|---|
| 359013 | 3/1990 | European Pat. Off. . |
| 0449002 | 10/1991 | European Pat. Off. . |
| 2115099 | 7/1972 | France . |
| 1268365 | 12/1968 | Germany . |
| 2424782 | 12/1975 | Germany . |
| 4008310 | 9/1991 | Germany . |
| 92/07706 | 5/1992 | WIPO . |

OTHER PUBLICATIONS

Modern Plastics International, Oct. 1992, "Injection Molding", p. 30.

*Primary Examiner*—Khanh Nguyen
*Attorney, Agent, or Firm*—Spencer, Frank & Schneider

[57] ABSTRACT

A mold closing unit for use in an injection molding machine for processing plastic materials for removal of moldings is provided with a device for actuating at least two first identical parts of an injection mold, which are transferred alternately into the space between the mold carriers of the mold closing unit on a guideway that runs transversally with respect to the closing direction for creation of an injection mold. Since all parts of the injection mold together with their corresponding swivel arms constitute a single oscillating crank with multiple arms, which transfers the first parts of the injection mold substantially in the parting plane of the mold closing unit, and since the position of the oscillating crank in the mold stressing chamber is determined by the mold closure itself, at least one of the first part of an injection mold being located outside the injection mold is fixed in a precise position that can be repeated for each injection cycle, the moldings can be handed over to a removal device and shorter production times with a faster ejection of moldings is obtained.

14 Claims, 5 Drawing Sheets

MOLD CLOSING UNIT FOR USE IN AN INJECTION MOLDING MACHINE FOR SYNTHETIC MATERIAL

BACKGROUND OF THE INVENTION

1. Field of the Invention

This invention relates to a mold closing unit for use in an injection molding machine for synthetic materials, comprising a device for moving at least two first identical parts of an injection mold, each of them mounted on a swivel arm, which is rotatable around an axis parallel disposed with respect to the closing direction, whereby the first parts of an injection mold are transferred alternately into at least one parting plane in the mold stressing chamber between the mold carriers of the mold closing unit on a transfer path vertically disposed with respect to the closing direction, for production of an injection mold.

2. Description of the Prior Art

German Published Patent Application 40 08 310 discloses a unit in which the parts of the injection mold are swivelled into the parting plane. The parts of the injection mold can be swivelled around a separate axis, whereby each part is individually swivelled. An axial displacement of the two parts against one another is necessary, so that one part can be moved into the parting plane inside the mold. As a result, the moldings can be taken out relatively quick from the injection mold, however, a separate drive to make the movement possible is required for each first part of the injection mold, which means that the removal position is changed for every injection cycle. However, since it should be avoided to touch the moldings during the removal process, the changing position is or no special importance in this case. The costs involved for the removal of the moldings from the mold cavity are increased in so far as separate drives are required for each first part of the injection mold.

A further installation for removal of moldings from the mold cavity is for example known from European Published Patent Application 359 013 A2. For removal installations of that kind it is, however, basically necessary, that a grab of the removal installation dips into the space between the stationary and the movable mold carrier, in order to withdraw the moldings from the mold cavities. That is why the opening width between the two mold carriers is mainly determined by the size of the grab to be introduced. However, the larger the necessary distance between stationary and movable mold carrier has to be for removal of the moldings, the more time is needed for bringing both mold carriers into the position with the required distance. Practice shows that at causes time and again problems, if the grab does not immediately get properly hold of the moldings during the removal process, which aggravates the circumstances additionally. This over and over again results in idle time, which counteracts a quick and troublefree production.

German Patent 12 68 365 furthermore discloses a system which is utilized for two-color injection. To this end the first parts of the injection mold are turned inside the injection mold around an axis disposed transversally with respect to the closing direction. It is possible to support the turning movement for example by an eccentric to the effect that the mold chambers are in the corresponding positions desired. However, the only purpose of this invention is, to make the mold accessible to the two-color injection and it is not possible to carry out moldings from the injection mold with this installation, since such a disposition of the swivel axis transversally to the closing direction, still would mean that the total opening distance had to be covered by the mold closing unit.

SUMMARY OF THE INVENTION

In view of the prior art discussed hereinbefore it is an object of the invention to provide a mold closing unit of the kind described first hereinbefore, that makes it possible to achieve a faster ejection of moldings by reduction of the production times, even for sensitive moldings.

That object is accomplished in accordance with the invention in that all first parts of the injection mold with its corresponding swivel arms constitute one single oscillating crank with multiple arms, which transfers the first parts of the injection mold substantially in the parting plane of the mold closing unit. Since the position of the oscillating crank itself in the mold stressing chamber is determined by the mold closure, as a result at least one of the first part of the injection mold, which is located outside the injection mold, is placed in an accurate position, which is repeatable for each injection cycle. It is possible to withdraw at least moldings from this position by means of a removal device.

The handling device of such a unit already constitutes a part of the mold or the mold a part of the handling device. The opening position does not serve anymore as before, for the introduction of the grab into the mold stressing chamber for withdrawal of the parts, but is merely a means to set free the handling device, so that it can be swivelled together with the molding into a position outside the mold stressing chamber. At the same time, as a result, the constructional prerequisites for connection of a further removal device, which can take the moldings out of the first part of the injection mold that has been swung out are created. An exact approaching point for the removal device, necessary for this process, results from the following mold closure itself, so that the oscillating crank, making possible a withdrawal, does not nearly require the position accuracy and thus the precision involving high expenditure for the manufacturing, which is needed if a handling device is used. In case the removal device cannot immediately get properly hold of the molding to take it out from the first part of the injection mold, there is enough time left betweeen the injection cycles to permit a further attempt. This offers the advantage that further idle times are avoided.

The sprues can be cut off from the moldings outside the mold stressing chambers and can be disposed of right there separately. Due to this the corresponding cutting- and ejection devices can be arranged outside the mold and therefore the mold costs be reduced. A further advantage is that no valuable cycle time for the cutting has to be planned and besides, additional space is obtained in the pedestal of the machine, which usually is designed for such disposal devices. Now the minimum opening distance between the individual injection cycles is not determined by the size of the grab of the handling, but by the molding itself, so that the cycle times, particularly those for flat moldings can be reduced, since smaller distances have to be covered. The exact approaching point for the removal unit results from the centering of the first part of the injection mold situated in the mold cavity, which is made possible by connection of the first parts of the injection mold placed inside and outside the mold closing unit through the oscillating crank. A further automation can be realized without problems at a favorable cost.

According to a preferred feature the nearly flat first parts of the injection mold, which are self-centered in the mold during the mold closure process, are held in fixing devices of the two-armed oscillating crank and the moldings are held in the first parts of the injection mold during the turning movement. The first parts of the injection mold are reduced to their minimum and consequently especially the moving masses are reduced, too, thus allowing a faster movement. Basically it is only necessary that the molding is fixed in such a manner at the first parts of the injection mold in the fixing devices that it can be securely held while it is turned out from the mold stressing chamber. From that point of view a just even fixing device is sufficient.

According to a preferred feature the oscillating crank is connected with a mold carrier by distance studs, movably limited in direction toward the axis. Besides, the complete oscillating crank is movably fixed at the axis. To set the oscillating crank free for the turning movement, it is supported on the axis axially movable and radially fixed. By that the first part of the injection mold is detached automatically from the remaining second parts of a mold during the opening process of the injection mold. In the end it is indifferent whether the piece is first detached from the stationary or from the movable mold carrier. This can in addition be supported by appropriate measures as for example undercuttings in the mold tooling or spring suspensions at the stationary mold carrier.

According to a preferred feature a toothed wheel work of the drive unit catches in one external side of an eccentric, on which two planet wheels that run together are mounted. One of the planet wheels runs together with a toothed wheel work of the stationary bearing and the other with a toothed wheel work of a toothed ring connected with the oscillating crank. In such an arrangement it is possible to realize a removal unit of that kind, even if only minimum space is available, whereby at the same time the already existing guide rods can be used as swivelling axis. It is possible to drive past the disturbing edges without problems by the eccentric to be precise. It is true however, that the application of the eccentric strains the guide rods assymetrically, but this strain is so far reduced, that only low masses have to be moved.

According to a preferred feature second parts of the injection mold are designed as exchange parts, which can be separated from the oscillating crank and which are connected with the injection mold during the manufacturing process, whilst the oscillating crank in this time is free to transport moldings. In such an arrangement the quick interchange of further parts of a mold is also accessible to automation. Thereby the exchange parts of the mold should be transferred into the mold by the same oscillating crank that removes the moldings from the mold during the injection cycles. Since the slit between the stationary and the movable mold carrier has to be opened only slightly, the interchange can be realized very quickly and with the same machine setting parameters. Besides, it is not necessary anymore to plan additional stressing means for the fixing of the exchange parts in the mold. The advantages of this exchange system become especially apparent when small quantities of CD's are produced and the unit price of the moldings is reduced. The interchange process can be fully automated, since the program control only differentiates between molding and exchange part, however, the rest of the interchange process is the same.

According to a preferred feature the oscillating crank is associated to a vacuum connection, which ends in vacuum channels at the periphery of the removal opening and the exchange parts are held in the oscillating crank by negative pressure whilst they are transferred from and to the injection mold and are fixed in it.

According to a preferred feature after transfer of the exchange parts to the injection mold, the negative pressure that holds the exchange parts in the oscillating crank is completely reduced as soon as the exchange part is placed correctly in the injection mold by negative pressure and the mold closure has been effected. This ensures that the exchange part fits closely all-over in the injection mold. Afterward the removal- or exchange process is realized in inversed direction.

According to a preferred feature the grab of the removal unit takes out the exchange parts from a determined position and can be moved into a position that allows transfer of the exchange parts into a pile hopper and to remove them from there. In such an arrangement the precise positioning outside the mold closing unit allows an accurate transfer from the exchange part to a grab. In case a pile hopper is used the grab can exchange easily and above all quickly one exchange part by another.

DETAILED DESCRIPTION OF THE PREFERRED EMBODIMENTS

Figure 1:
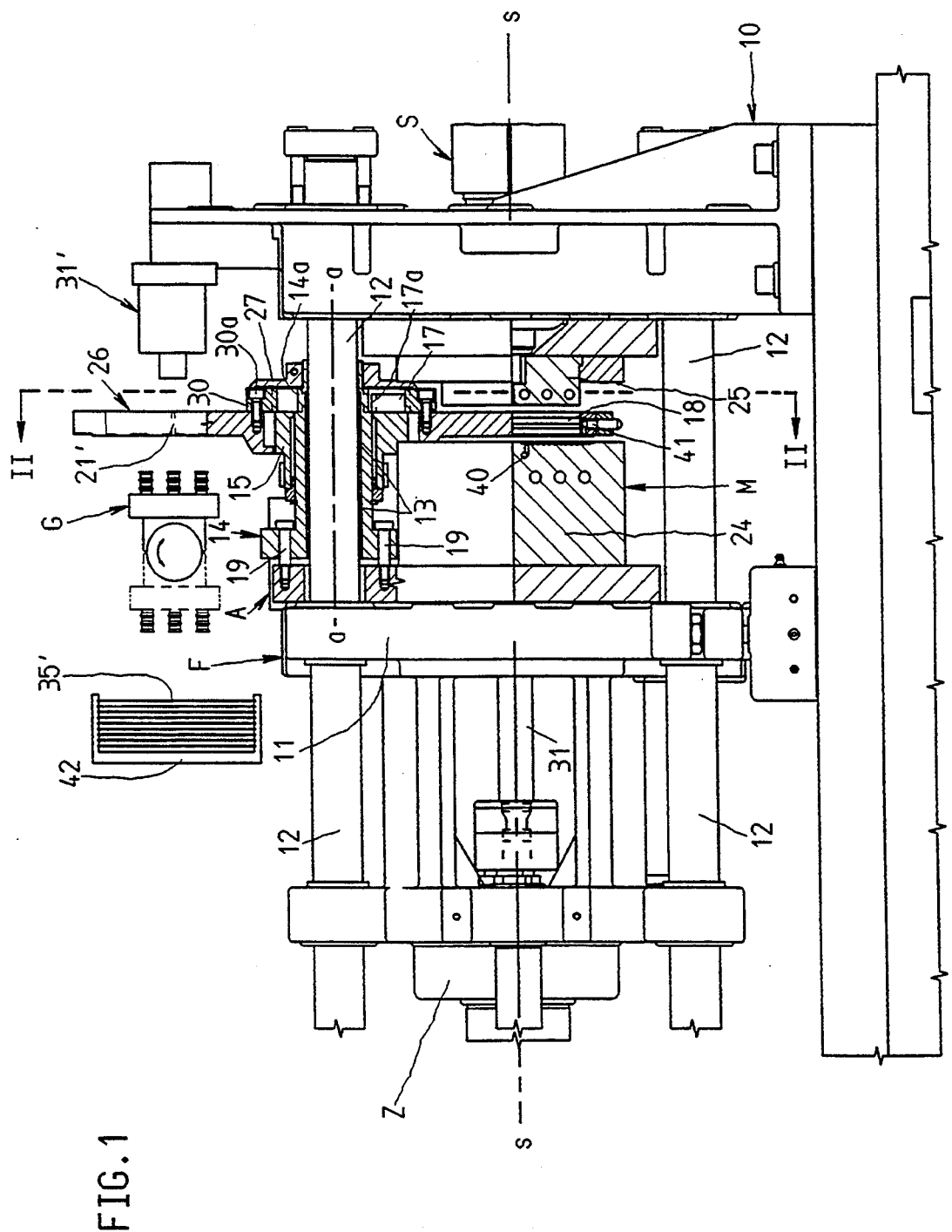
FIG. 1 is a side elevation showing a mold closing unit, including partially sectional views.

An illustrative embodiment of the invention will now be described with reference to the drawings from which further advantages afforded by the invention will become apparent.

The illustrated mold closing unit F is used in an injection molding machine for synthetic material. An injection molding unit basically injects synthetic material into the mold stressing, or clamping chamber, which is constituted by second mold parts 24, 25 when the second mold parts are in a closed position, which is achieved by closing cylinders Z. During this process the second mold parts 24, 25, are located between a stationary mold carrier 10 and a movable mold carrier 11, that are interconnected by guide rods 12. The movable mold carrier 11 is guided on the guide rods 12, which are supported by the stationary mold carrier 10. When the mold carrier 11 is advancing toward mold carrier 10, the mold closing unit is in a closing phase.

Two identical first mold parts of an injection mold 34 are provided, which are alternately transferred to the space between the mold carriers 10, 11, of the mold closing unit F, on a guideway f, running vertically with respect to the closing direction s-s, substantially in the parting plane of the mold closing unit for creation of an injection mold M. Thereby the first parts of an injection mold 34 are connected with an oscillating crank, or rocker 26, so that they constitute a motional unit. Basically it is, of course, possible to connect several parts of an injection mold so that they constitute an oscillating crank with multiple pivot arms. As particularly appears in FIG. 2, the oscillating crank 26, which surrounds the first parts of an injection mold 34, is rotatable around an axis transversally disposed with respect to a guideway f.

FIG. 1 reveals that the nearly flat first parts of an injection mold 34 are arranged in nearly flat annular fixings 26a provided with removal openings 18. Basically the fixings as well as the first parts of an injection mold 34 must only have such a thickness to secure that the moldings 21, 21', are properly held during the swivelling (or pivoting) movement. During the following mold closure the first parts of an injection mold 34 center themselves in the injection mold owing to their shape and as a result define the mold cavity 43 together with the second mold parts 24, 25. Of course, it is also possible to produce moldings with a depth that exceeds the thickness of the fixings 26a with this mold closing unit. The only difference resulting is a larger opening width between the injection cycles. Since the first part of an injection mold is a part of the mold itself and it is essential for the production of moldings of best possible quality that all parts of the multipart injection mold are fitted together exactly, a precise positioning of the oscillating crank at the axis a—a results by the mold closure itself. However, as an exact positioning of the first part of an injection mold resting in the mold stressing chamber causes that the molding outside the mold cavity or at least outside the injection mold M is also placed in its exact position, the molding 21' can be precisely positioned in a simple way. This is particularly desireable in case a grab G of a handling H is used. At the same time precision requirements for the rest of the axis are not high.

In the first example of the possible executions, the oscillating crank 26 is pivoted at one guide rod 12 by means of its hub. Another possibility to solve this task is to dispose an axis directly at one of the mold carriers. The oscillating crank is driven at the guide rod by a drive unit A. As drive means for instance toothed wheels, toothed racks or driving belts are used, which drive the oscillating crank preferably at the external side in the area of the hub. Especially the application of a toothed rack offers the possibility to approach exact final positions, which then can be stated more precisely by the self-centering of the first parts of an injection mold. The guide rod is provided with a bearing bush 14 that is placed around a slide bearing 13 and constitutes the hub of the oscillating crank. The bearing bush 14 is connected with the movable mold carrier 11 by means of distance studs 19, partially movable in the direction toward the axis a—a. It is also possible to provide the stationary mold carrier 10 with such an arrangement. To place the arrangement at the movable mold carrier offers the advantage that when the injection mold is opened the first part of the injection mold is first detached from the movable mold carrier and then from the stationary mold carrier, which can in addition be supported, if necessary, by arranging corresponding undercuttings at one of the first part of an injection mold or by spring means. In the end it is insignificant in which succession the first parts of an injection mold placed at the oscillating crank are detached from the mold carriers. The detachment can additionally be supported, if necessary, if an ejector unit 31, used for a purpose not intended, handles the first part of the injection mold an order to adjust the distance pre-determined by the distance studs 19 between bearing bush and mold carrier. FIG. 1 shows the detached position immediately before the real injection process starts.

Figure 2:
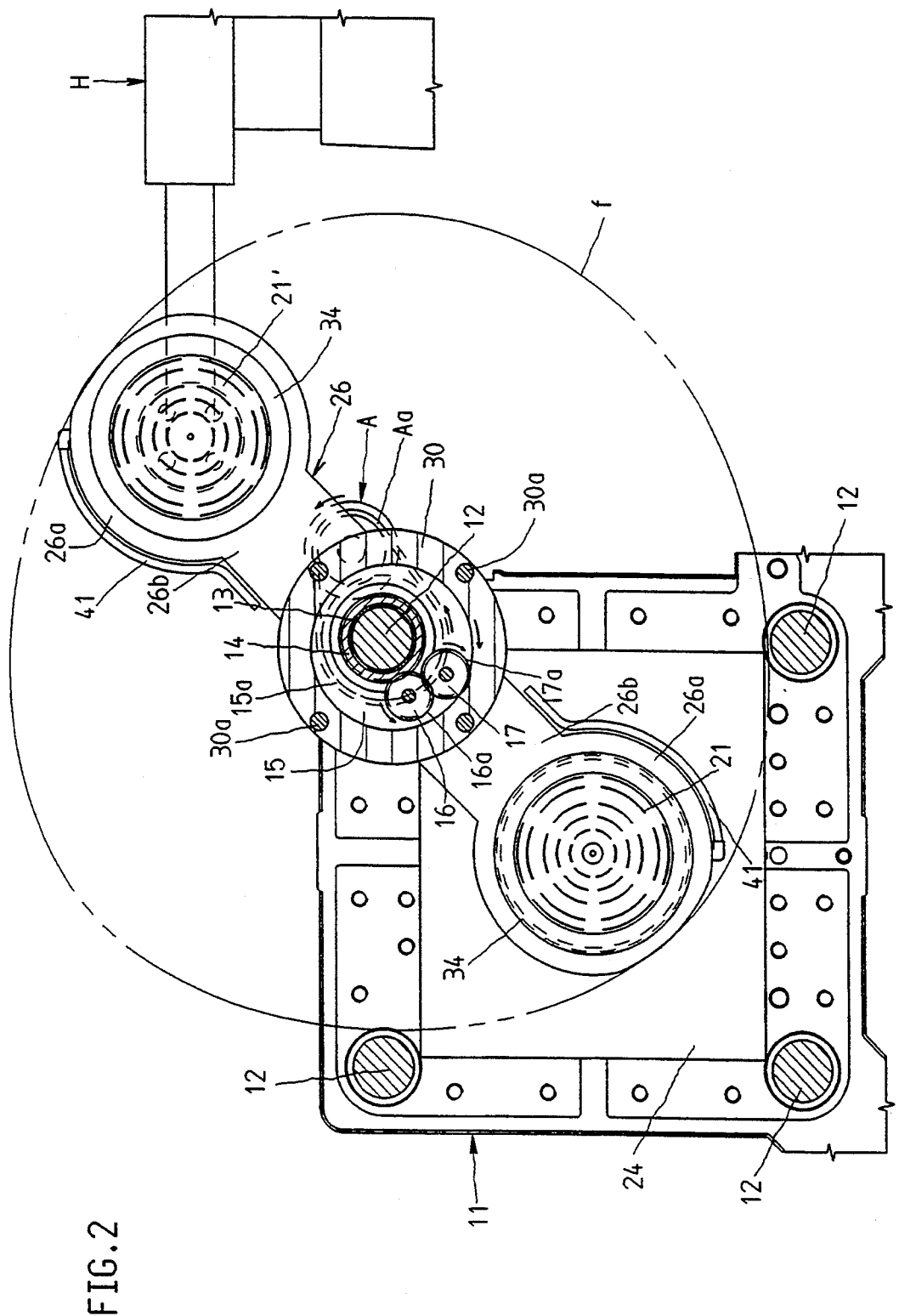
FIG. 2 is a sectional view taken on line II—II in FIG. 1 showing the mold closing unit.
Figure 4:
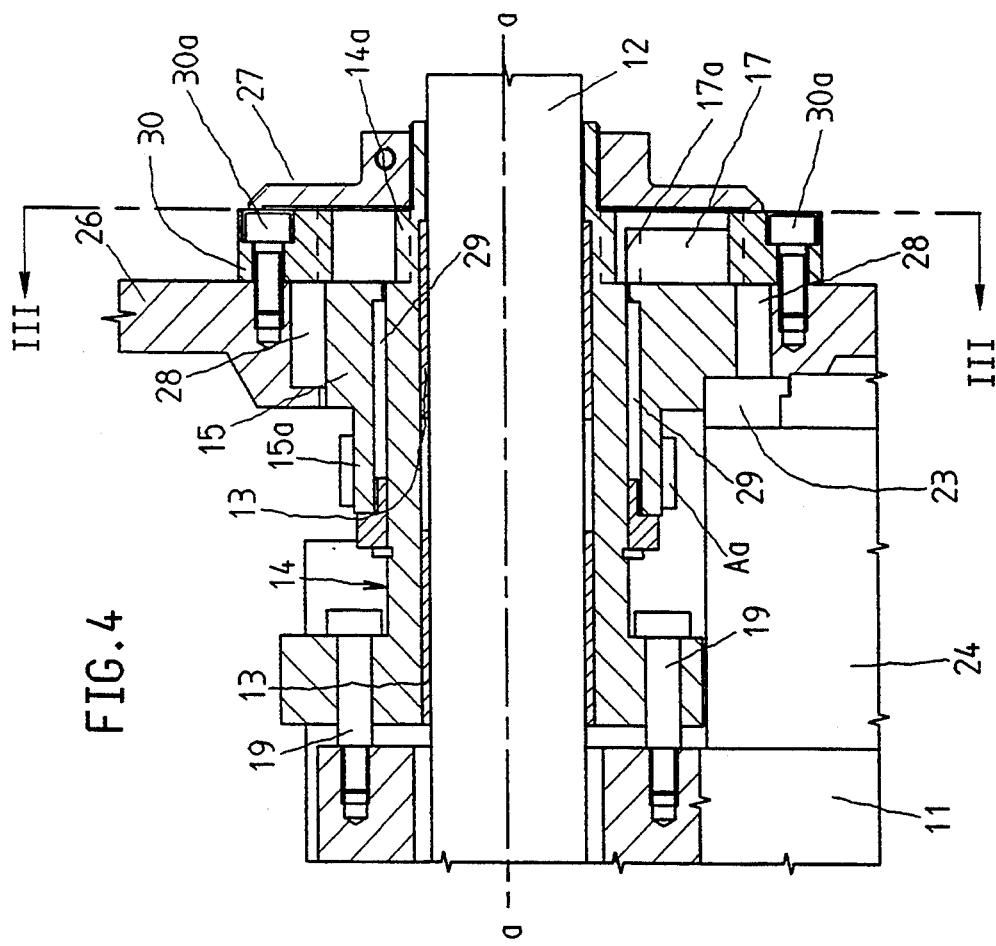
FIG. 4 is a window of a side elevation in the area of the gear.
Figure 3:
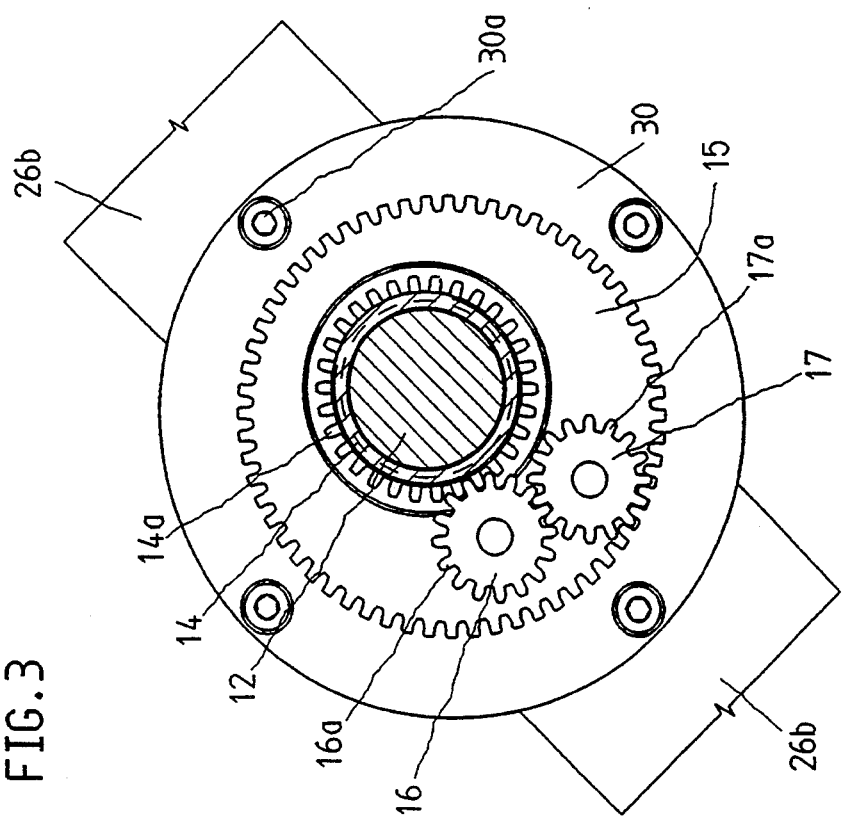
FIG. 3 is a window of the gear scale in a view according to FIG. 2.

As shown in FIG. 2 the oscillating crank 20 that is provided with two swivel arms, or pivot arms 26b describes a guideway f, which is approximately elliptical. This is necessary on the one hand in order to keep the mold stressing chamber as small as possible and on the other hand to have enough space left to go past the guide rods 12. This disadvantage is consciously accepted, considering the costs which a larger mold stressing chamber would involve. However, to achieve the elliptical motion, it is necessary that the drive unit moves an eccentric 15 by a planetary gear, which is in connection with the oscillating crank 26. The planetary gear is subsequently described more in detail on the basis of FIGS. 3 and 4.

The toothed wheel work Aa of the drive unit is in connection with the toothed wheel work 15a of the eccentric 15 by means of a toothed belt. If the eccentric 15 is turned, a corresponding movement of the oscillating crank 26 is produced, as is apparent by the arrows in FIG. 2. This is caused owing to the fact that the planet wheels 16 and 17, that are interconnected are placed at the eccentric. During the turning movement the toothed wheel work 16a of the planetary wheel 16 bites into the toothed wheel work 14a of the bearing bush 14, which is fixedly mounted on the guide rod 12. This radial fixing is effected by the distance studs 19. The other planet wheel 17 bites with its toothed wheel work 17a into the toothed wheel work 30b of a toothed ring 30, which is in connection with the oscillating crank 26. The parts 14, 15 and 30 are separated from each other by bearings 28, 29. The toothed ring is closed by a crown 27 in direction towards the stationary mold carrier 10.

The proportion from the toothed wheel work of the toothed ring 30 to the toothed wheel work 14a of the bearing bush 14 has been settled upon 2:1, so that the first parts of an injection mold 34 always can occupy identical positions. As is apparent especially from FIG. 2 the toothed wheel work 15a is disposed concentrically and the toothed ring 30 eccentrically through the guide rods 12 with respect to the axis a—a. Basically the guideway thereby merely extends into the space behind the machine, so that the operator's room in front of the machine is not endangered. When the pieces are swivelled, their injection molding has been completed. If necessary, the swivelling movement or, especially when several parts of an injection mold are used, the period between finishing and removing the moldings can be used for cooling the moldings. The removal process also can be supported by an auxiliary ejector unit 31'.

Aside from the first parts of an injection mold 34 it is also possible to provide exchange parts, or exchange able components 35' which limit a part of the mold stressing chamber when the mold is closed. For this purpose they are detachably mounted on the movement unit, that is on the oscillating crank 26 and thus can remain connected with the injection mold M during the production of the moldings. While the exchange parts 35' are connected with the injection mold M, the movement unit can be applicated for the transport of moldings 21, 21'.

Figure 5:
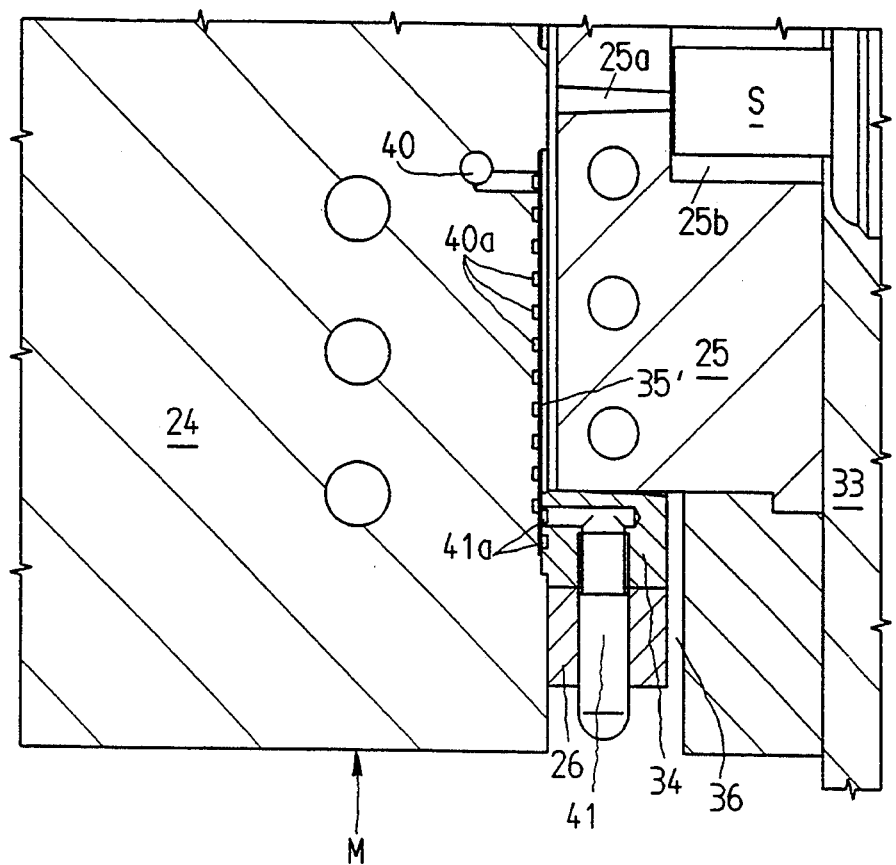
FIG. 5 is a side elevation showing a cross section of an injection mold in a closed position.
Figure 6:
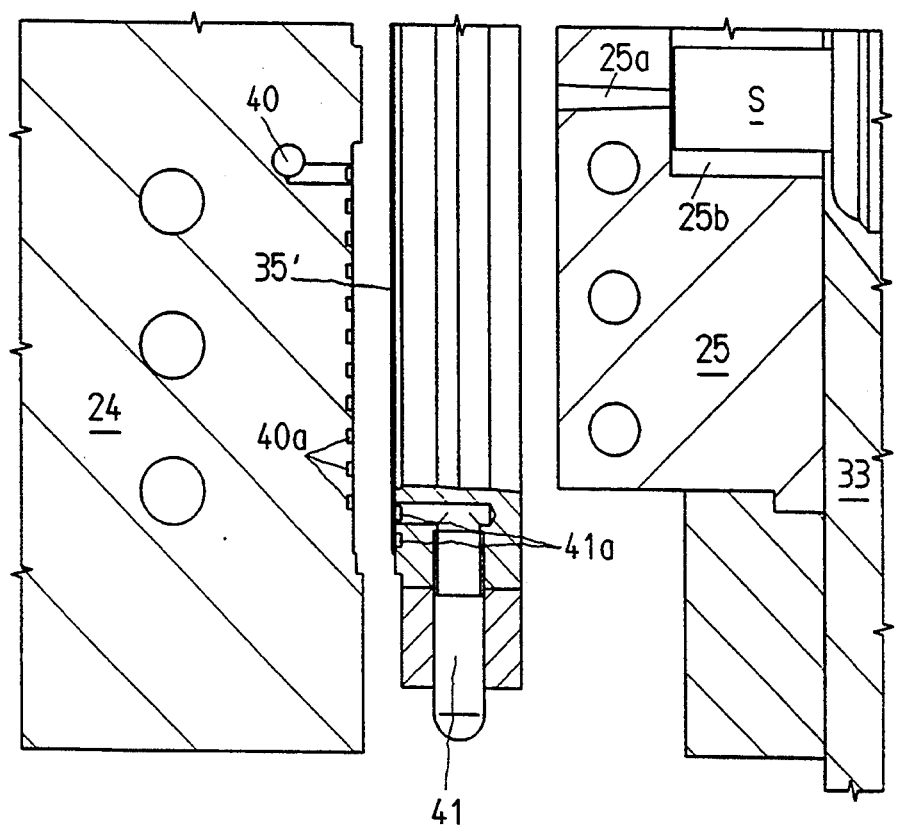
FIG. 6 is a side elevation showing a cross section of an injection mold in an open position.

The exchange parts are held at the frontal sides of the first parts of an injection mold 34 of the oscillating crank 26 by negative pressure. As soon as the exchange part 35' has been swivelled into the injection mold, the mold is closed, whereupon the negative pressure, sealingly holding the exchange part 35' at its perimeter on the oscillating crank, is significantly reduced and instead negative pressure is built up in the second mold part 24 of the injection mold. As FIG. 6 reveals the vacuum channels 41 associated to the oscillating crank are located in an area in which the two second mold parts 24, 25 are separated by a certain distance, even after the mold has been closed. The exchange part 35' is held at its perimeter by the vacuum channels 41a. The vacuum channels are open in the closing direction of the mold closing unit. The openings of the vacuum channels 41a end radially more outside in an area where no vacuum channels 40a are provided. The vacuum channels 40a nearly cover completely one side of the mold stressing chamber (FIG. 5). The negative pressure is generated by the vacuum connection 41. The exchange part is handed over to the second mold part 24 when the mold closure is realized. The vacuum channels 40a to which vacuum is applied by the vacuum connection 40, are interconnected by transversal links, which are not represented in the drawings. As long as the negative pressure is maintained in the vacuum channels 40a, the exchange part remains in the injection mold. Only when, in reversion of the sequence described at the beginning, the vaccum is rebuilt in the vacuum channels 41a, the exchange part 35' can be again exchanged.

Alternatively the exchange parts can be held at the perimeter of the removal openings 18 in rubber lips, so that they are transported by the same means, but independent from the transport process for the moldings.

During the manufacturing process of the moldings an injection molding unit S submerges with its nozzle into a gate system 25b and the material is then supplied by a sprue channel 25a.

As represented in FIG. 1 a grab G is used for the removal of the moldings 21, 21' and the exchange parts 35'. Thereby a pile hopper may be associated with this grab, so that the exchange parts 35' to be exchanged can be handed over directly into the pile hopper by a turning of for example 180°. For instance this process would apply to sound recording discs in the production of CD's.

Figure 7:
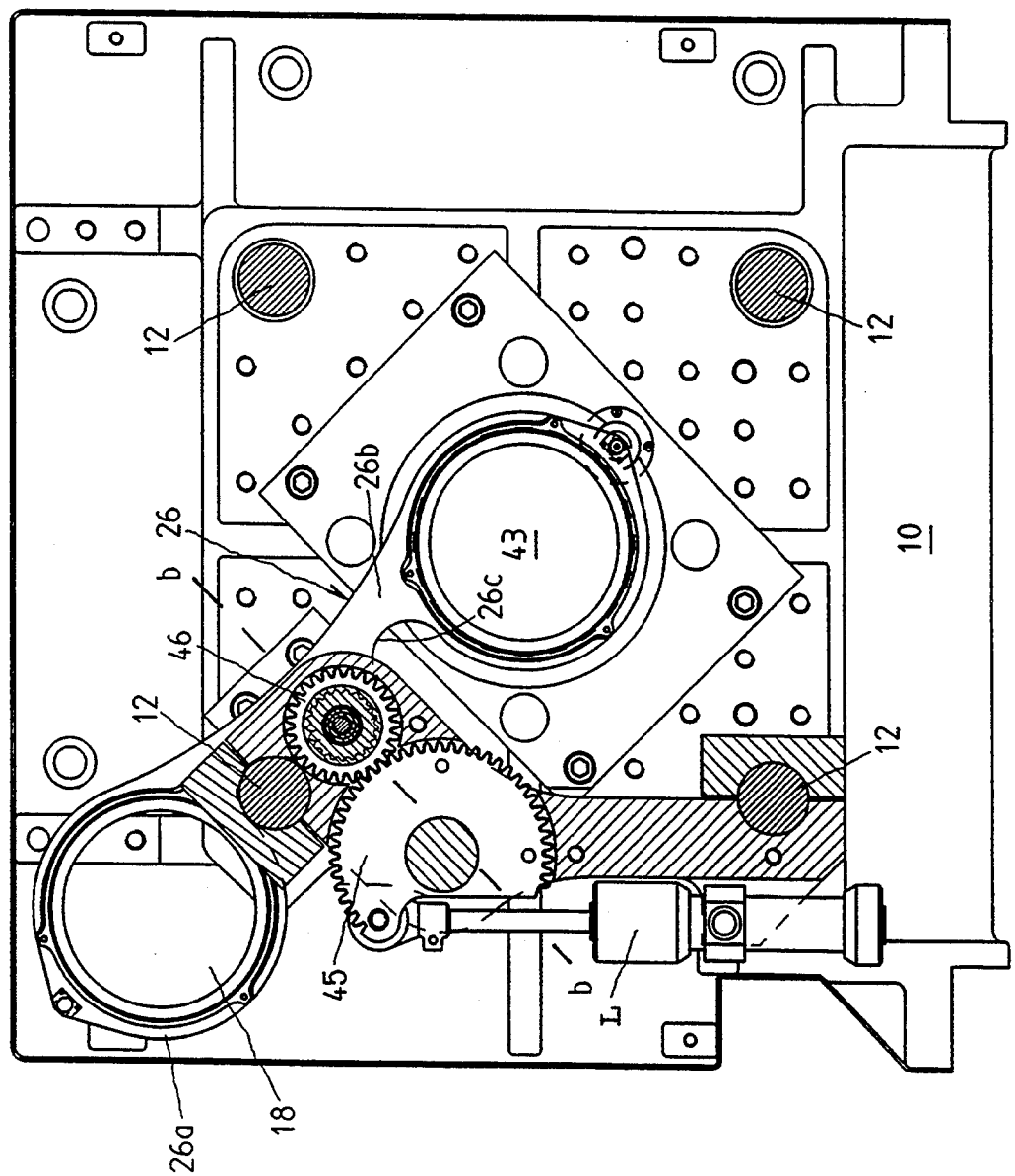
FIG. 7 is a sectional view of the opened mold closing unit in a further execution in direction toward the stationary mold carrier.

FIG. 7 shows a further possible execution, which differs from the first example because of the arrangement of the swivelling axis for the oscillating crank 26 and the kind of drive. The swivelling axis including slide bearing 13' and bearing bush 14' is not placed anymore at one guide rod 12, through which the space requirements are minimized. However, to avoid a collision with the guide rods, the swivelling arm is mounted symetrically with respect to plane b—b and disposes of recesses 26c, which alternately border on the guide rod. Thereby as drive A a linear drive L is used, whose linear movements are converted into rotation by the toothed quadrant disc 45 and the toothed wheel 46. Driving belts may be used as well instead of the linear drives.

What is claimed is:

1. In a mold closing unit for a plastic material injection molding machine, the closing unit including:
    first and second mold carriers mounted for movement relative to one another in a closing direction and defining a mold clamping chamber therebetween, the clamping chamber having a parting plane;
    a rocker comprised of pivot arms and at least two mold parts each mounted on a respective one of the pivot arms of the rocker, said mold parts being configured to hold moldings therein, the rocker being rotatably mounted about an axis that is parallel to the closing direction for moving the mold parts on a transition path disposed on a plane which is perpendicular to the closing direction, and alternatingly, into the parting plane in the mold clamping chamber to form a mold with a mold cavity when the first and second mold carriers are moved in the closing direction to close the mold, wherein the rocker by virtue of the mold closing is set into a repeatable position from injection cycle to injection cycle, the improvement comprising:
    exchangeable components releaseably mountable, respectively, in said at least two mold parts for being transported into the mold cavity; and
    means for separating an exchangeable component from its mold part in the mold cavity and for detachably connecting the exchangeable component to the mold to limit a part of the mold, wherein the exchangeable component remains connected to the mold during a period of making injection molded product, with the rocker being free of the exchangeable component for transporting injection molded product out of the parting plane during the period.

2. The mold closing unit according to claim 1, wherein said rocker includes means for pivoting each of said mold parts repeatedly with each injection cycle, and substantially accurately, into a removal position, said removal position being disposed outside of said mold stressing chamber, said removal position further being accessible by a handling unit for removing said moldings from said mold parts.

3. The mold closing unit according to claim 1, wherein:
    said rocker is rotatable about said axis such that, during rotation of said rocker, said pivot arms describe a guideway that is transverse with respect to said axis;
    said rocker is axially movable and radially fixed with respect to said axis; and
    said rocker includes nearly flat annular fixings thereon for holding said mold parts in respective ones of said pivot arms, each of said annular fixings comprising a removal opening therein.

4. The mold closing unit according to claim 1, wherein said rocker includes a hub, said mold closing unit further including a drive unit for driving said rocker, said drive unit being disposed exteriorly of said hub.

5. The mold closing unit according to claim 1, wherein:
    said hub consists of a bearing bush connected to one of said first and second mold carriers.

6. The mold closing unit according to claim 1, wherein said rocker is connected to one of said first and second mold carriers by a plurality of distance studs, said distance studs being partially movable in a direction defined by said axis.

7. The mold closing unit according to claim 1 and further including an ejector unit for detaching said rocker from said one of said first and second mold carriers.

8. The mold closing unit according to claim 4, wherein said drive unit includes a wheel work; and said hub consists of a fixedly mounted bearing bush comprising a toothed wheel work; said mold closing unit further including:

an eccentric connected to said rocker and being driven by said drive unit, said eccentric including a toothed wheel work cooperating with said wheel work of said drive unit such that a rotation of said eccentric effects a corresponding rotation of said rocker;

a toothed ring connected to said rocker, said toothed wheel including a toothed wheel work;

a first planet wheel and a second planet wheel interconnected with said first planet wheel, said first planet wheel and said second planet wheel being disposed on a face of said eccentric, said first planet wheel including a toothed wheel work which bites into said toothed wheel work of said bearing bush, said second planet wheel including a toothed wheel work which bites into a toothed wheel work of said toothed ring.

9. The mold closing unit according to claim 8 and further including at least one guide rod connecting said first and second mold carriers, wherein:

said toothed wheel work of said toothed ring and said toothed wheel work of said bearing bush have a proportion of 2 to 1; and said at least one guide rod includes a guide rod with respect to whose longitudinal axis said eccentric is disposed concentrically and said toothed ring eccentrically.

10. The mold closing unit according to claim 1 and further including at least one guide rod connecting said first and second mold carriers, wherein:

said rocker is symmetrical with respect to a plane which includes said axis and which is perpendicular to said parting plane; and said pivot arms include recesses for accommodating said at least one guide rod such that each of said recesses alternately border an associated one of said at least one guide rod during pivoting of said pivot arms.

11. The mold closing unit according to claim 1, wherein:

said rocker includes means for holding said mold parts in respective ones of said pivot arms, each of said means for holding comprising therein a removal opening having a perimeter; and each of said pivot arms includes a vacuum connection for detachably connecting said exchangeable components to said rocker, said vacuum connection ending in vacuum channels at said perimeter of said removal opening, said vacuum channels being open in said closing direction.

12. The mold closing unit according to claim 1, wherein said means for separating the exchangeable component from its mold part in the mold cavity and for detachably connecting the exchangeable component to the mold includes:

means for detachably connecting said exchangeable components to said rocker by negative pressure during a transfer of said exchangeable components to and from said rocker; and means for detachably connecting said exchangeable components by negative pressure to the mold to limit a part of the mold clamping chamber, said negative pressure in said rocker being reduced to zero as soon as said exchangeable components have been transferred to the mold.

13. The mold closing unit according to claim 2 and further including a removal unit comprising a grab for withdrawing said exchangeable components from said mold parts when said each of said mold parts is in said removal position, said grab further being movable into a position effective for depositing and removing said exchangeable components to and from a pile hopper.

14. The mold closing unit according to claim 13, wherein said grab is further effective for removing said moldings from said rocker.

* * * * *